(12) United States Patent
Hungerbuehler

(10) Patent No.: US 6,556,156 B1
(45) Date of Patent: Apr. 29, 2003

(54) CIRCUIT AND METHOD FOR CALIBRATING THE PHASE SHIFT BETWEEN A PLURALITY OF DIGITIZERS IN A DATA ACQUISITION SYSTEM

(75) Inventor: Viktor M. Hungerbuehler, Satigny (CH)

(73) Assignee: Acqiris, Plan-les-Quates (CH)

( * ) Notice: Subject to any disclaimer, the term of this patent is extended or adjusted under 35 U.S.C. 154(b) by 28 days.

(21) Appl. No.: 09/712,304

(22) Filed: Nov. 14, 2000

Related U.S. Application Data

(63) Continuation of application No. PCT/CH99/00154, filed on Apr. 16, 1999.

(30) Foreign Application Priority Data

May 18, 1998 (EP) .............................................. 98810452

(51) Int. Cl.[7] .................................................. H03M 1/10
(52) U.S. Cl. ........................ 341/120; 341/155; 341/118
(58) Field of Search ................................ 341/120, 118, 341/117, 119, 121, 155

(56) References Cited

U.S. PATENT DOCUMENTS

| | | | |
|---|---|---|---|
| 4,736,189 A | | 4/1988 | Katsumata et al. ......... 341/120 |
| 4,763,105 A | | 8/1988 | Jenq ............................ 341/120 |
| 4,926,186 A | * | 5/1990 | Kelly et al. .................. 342/360 |
| 5,294,926 A | * | 3/1994 | Corcoran .................... 341/120 |
| 5,357,310 A | * | 10/1994 | Kawamura et al. ....... 250/201.8 |
| 5,532,742 A | * | 7/1996 | Kusaka et al. ............ 348/222.1 |

FOREIGN PATENT DOCUMENTS

EP   0 629 966 A1   12/1994

OTHER PUBLICATIONS

Georg Huba, "High–Speed Data Acquisition with SDA 8020 by Data Splitting", *Siemens Components XXIV*, Dec. 1989, pp. 223–235.

* cited by examiner

*Primary Examiner*—Jean Bruner Jeanglaude
(74) *Attorney, Agent, or Firm*—Pearne & Gordon LLP

(57) ABSTRACT

The analog-to-digital conversion circuit for high-frequency data acquisition system comprises a plurality of digitizers (6, 9) capable of sampling and digitizing a high-frequency analog input signal (a; w1), the sampling times of the different digitizers being phase-shifted, and a circuit (3, 4, 5, 8, 11) for calibrating the phase shift between a first digitizer and a second digitizer. The phase shift calibration circuit (3, 4, 5, 8, 11) determines a phase shift correction value (u) so as to minimize the difference between a sequence of digital values ($r_i$) determined by the first digitizer (6) and a sequence of corresponding digital values ($u_i$) determined by interpolating the digital values ($s_i$) supplied by the second digitizer (9). The value u can be calculated according to the following equation:

$$u = p \cdot \frac{\sum_i (r_i - s_i) \cdot (s_i - s_{i-1})}{\sum_i (s_i - s_{i-1}) \cdot (s_i - s_{i-1})}$$

wherein p represents the sampling period, $r_i$ represents the value supplied by the first digitizer (6) at the time i and $s_i$ the value supplied by the second digitizer (9) at the corresponding sampling time.

19 Claims, 3 Drawing Sheets

CIRCUIT AND METHOD FOR CALIBRATING THE PHASE SHIFT BETWEEN A PLURALITY OF DIGITIZERS IN A DATA ACQUISITION SYSTEM

This application is a continuation based on international application PCT/CH99/00154 (WO99/60496), filed on Apr. 16, 1999, and claiming priority of the unpublished application EP98810452.7 of May 18, 1998, whose contents are hereby incorporated by way of reference.

The international applications PCT/CH98/00377 (WO99/60494) and PCT/CH99/00153 (WO99/60495), whose contents are hereby incorporated by way of reference, claim the priority of the same application EP98810452.7.

FIELD OF THE INVENTION

The present invention concerns a circuit and a method for calibrating the phase shift between a plurality of digitizers in a data acquisition system.

RELATED ART

Many types of data acquisition systems are known, for example transitory recorders and digital oscilloscopes, in which it is necessary to convert one or several analog signals into one or several digital signals capable of being stored in a digital memory and processed by a digital processor. These systems comprise generally an input stage constituted of one or several digitizers and of a memory for digitized data; the processor accesses said memory most often through a bus. In low-frequency systems, this memory can for example be constituted directly by the RAM of a computer. The digitized data are stored in this memory and processed, for example displayed, by the processor of this computer either in real time or later, for example when all the data have been acquired.

More and more often in electronic technology, very high frequency analog signals requiring very fast acquisition systems, for example oscilloscopes, are used. Digitizers are currently made that work with a sampling frequency greater than 500 MHz, for example on the order of 1 GHz or more; it is to be predicted that these current limits will be exceeded with the appearance of better performing components. These digitizers enable by virtue of the Nyquist principle to supply an unambiguous digital representation of analog signals having a maximum frequency of several hundred MHz.

Many applications however require the acquisition of signals with even greater frequencies. The performance and cost of digitizers constitute an obstacle to the making of ultra-fast acquisition systems. Thus the use of systems comprising two digitizers in parallel is known. The sampling times of the digitizers are phase-shifted so that the first digitizer supplies a sequence of samples d0, d2, d4, . . . at the times t0, t2, t4, . . . whereas the other digitizer supplies at the intermediary times t1, t3, t5, . . . a sequence of samples d1, d3, d5, . . . that are phase-shifted by a half-period of sampling p. By combining these two sets of samples, one thus obtains a sequence d0, d1, d2, d3, . . . representing the analog input signal sampled at a rate double that of each digitizer. This principle has also been applied to systems comprising 3, 4 or even more digitizers in order to further increase the speed of the digital sample signal.

The sampling times of the two digitizers must be controlled accurately in order to obtain the required phase shift by p/2. Any deviation of the theoretically required phase leads to errors in the digitized signal, for example to the introduction of harmonics that do not appear in the original signal.

A purpose of the present invention is thus to propose a circuit for analog-to-digital conversion that is improved over the prior art circuits. In particular, a purpose of the present invention is to propose a conversion circuit comprising a plurality of digitizers capable of sampling and digitizing a high-frequency analog input signal, the sampling times of the different digitizers being phase-shifted, the circuit comprising improved means for calibrating the phase shift between a first digitizer and a second digitizer.

Calibration circuits have already been proposed in the prior art. The U.S. Pat. No. 4,736,189 for example describes a method for calibrating sampling phases using a calibration signal whose frequency is derived from the sampling clock by complex operations. Furthermore, this method requires to choose the points on a signal taken as reference that are close to the middle of a slope. This requires either a control of the phase of the calibration signal, or a particular choice of the used digital values.

U.S. Pat. No. 4,763,105 describes another method for calibrating digitizers using complex operations, requiring notably Fourier transforms. Costly digital processing means are thus necessary for implementing this method.

U.S. Pat. No. 4,962,380 describes another method that uses the sampling clock directly for calibrating. This method depends critically on the shape of the calibration signal, which must be for example strictly sinusoidal, which is difficult to ensure. Furthermore, it is necessary to adjust not only the relative phases, but also the absolute phase of the first digitizer.

EP260375 describes a method for calibrating analog-to-digital converters depending on a signal whose frequency must correspond exactly to the sampling frequency. This method is thus very difficult to apply when the sampling frequency is very high.

A purpose of the present invention is thus to propose a calibration method and circuit that are improved over the prior art methods and circuits, in particular a circuit and a method capable of being implemented more easily or more cost-effectively, that do not require complex digital calculation means, and that can also be used for calibrating digitizers with a very high sampling frequency, for example digitizers using a sampling frequency on the order of the GHz.

BRIEF SUMMARY OF THE INVENTION

These purposes are achieved according to the invention by means of an analog-to-digital conversion circuit for high-frequency data acquisition system, comprising a plurality of digitizers capable of sampling and digitizing a high-frequency analog input signal, the sampling times of the different digitizers being phase-shifted, means for calibrating the phase shift between a first digitizer and a second digitizer being provided, wherein said means for calibrating said phase shift determine said phase shift so as to minimize the difference between a sequence of digital values determined by the first digitizer and a sequence of corresponding digital values determined by interpolation of the values supplied by the second digitizer.

BRIEF DESCRIPTION OF THE DRAWINGS

The invention will be better understood with the aid of the description of an embodiment of the invention given as example and illustrated by the figures showing.

DETAILED DESCRIPTION OF THE INVENTION

Although the method and the circuit of the invention are particularly designed to be used in an oscilloscope, notably in a high-frequency digital oscilloscope, or in a transitory recorder, the one skilled in the art will understand that this method and this circuit can also be used in any high-frequency data acquisition system.

Figure 1:
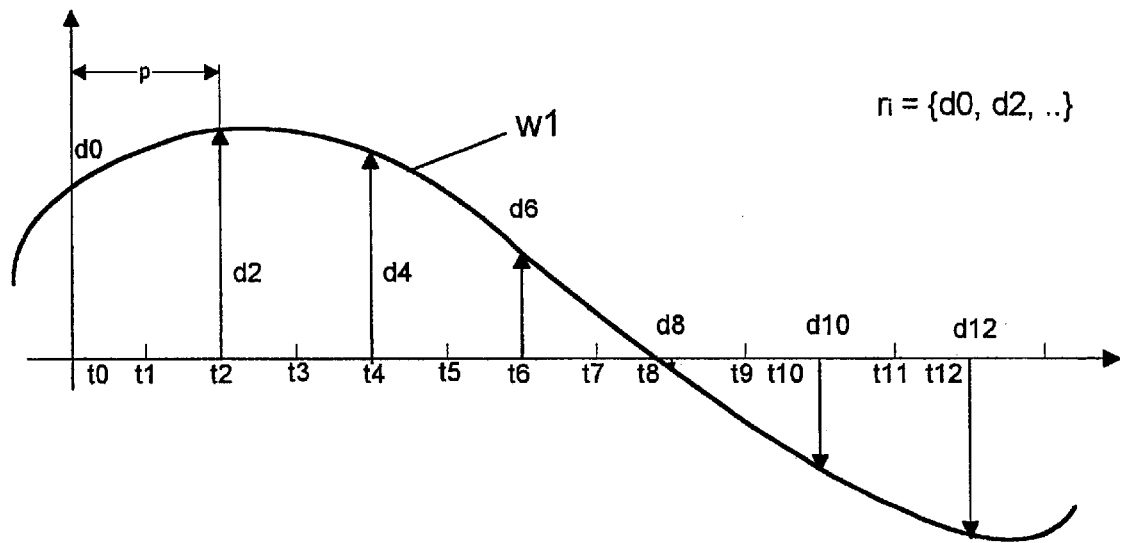
FIG. 1 a temporal diagram of a signal w1 showing in particular the values d0, d2, d4, . . . obtained by a first digitizer at the instants t0, t2, t4, FIG. 2 a temporal diagram of the signal w1 showing in particular the values d1, d3, d5, . . . obtained by a second digitizer at the times t1, t3, t5, . . . being phase-shifted relative to the ideal sampling times t1', t3', t5', FIG. 3 a temporal diagram showing superimposed the signal w1 as well as a signal w1' obtained by placing the values d1, d3, d5, . . . of the second digitizer at the ideal sampling times t1', t3', t5', FIG. 4 a temporal diagram showing superimposed the signal w1' as well as a signal w1" obtained by phase-shifting by u the signal w1.
Figure 2:
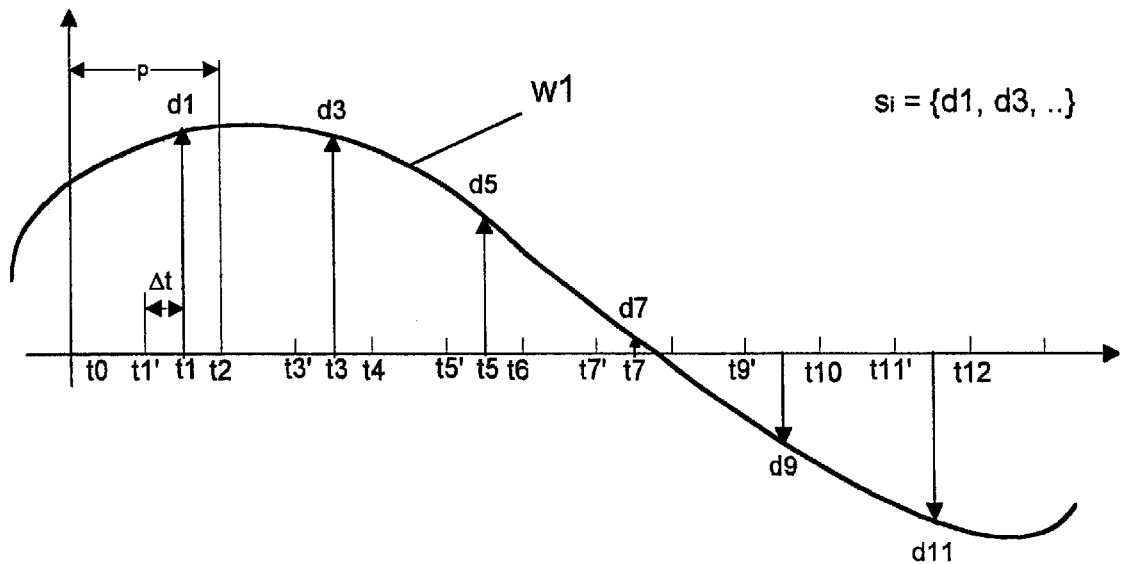

FIG. 1 shows an analog signal w1 as well as a digital sequence $r_i=\{d0, d2, d4, \ldots\}$ produced by a digitizer 6 (illustrated in FIG. 4) by sampling w1 at the sampling times t0, t2, t4, . . . spaced by a sampling period p. Similarly, FIG. 2 illustrates the analog signal w1 as well as a digital sequence $s_i=\{d1, d3, d5, \ldots\}$ produced by a digitizer 9 (FIG. 4) by sampling w1 at the sampling times t1, t3, t5, . . . spaced by the same sampling period p. The two digitizers 6, 9 thus use a sampling rate f=1/p. By interlacing the digital sequences $r_i$ and $s_i$ produced by the two digitizers, a digital sequence d0, d1, d2, d3, . . . is obtained that represents the signal w1 sampled at a rate 2/p. In this manner, it is possible to double the sampling frequency of the signal w1.

Ideally, the values $s_i$ should be produced by the second digitizer 9 by sampling w1 at the ideal times t1', t3', t5' that are phase-shifted by exactly half a sampling period p relative to the sampling times t0, t2, t4, . . . used by the first digitizer 6. In practice, and particularly when the sampling frequencies are very high, it is difficult to ensure an accurate phase shift. It will thus be observed in FIG. 2 that the real sampling times t1, t3, t5, are phase-shifted by a value $\Delta t$ relative to the ideal times t1', t3', t5'. The values of $s_i$ are thus different from the values of w1 at the ideal sampling times t1', t3', t5'.

Figure 3:
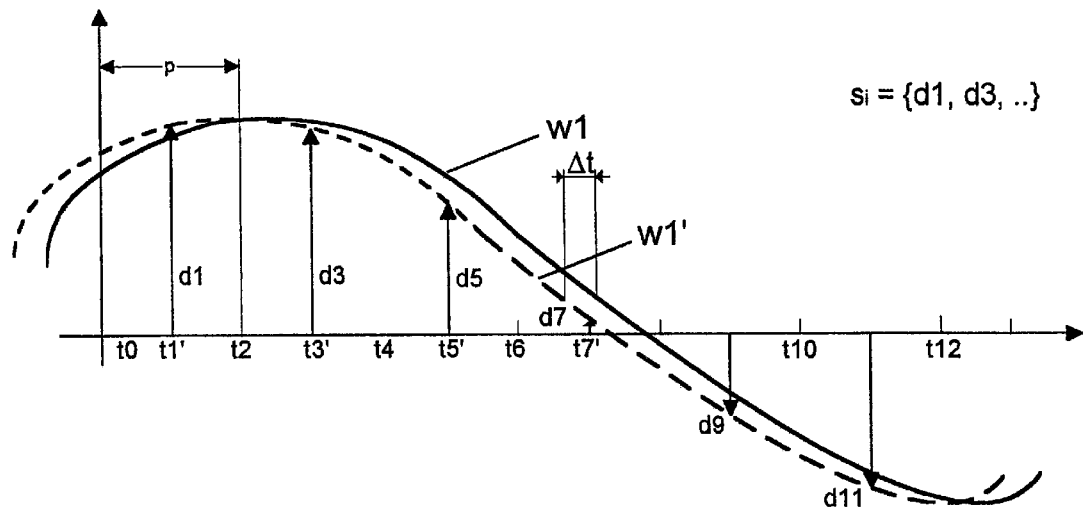

FIG. 3 illustrates superimposed the signal w1 as well as the values $s_i$ produced by the second digitizer 9 but replaced at the theoretical times t1', t3', t5', . . . . The curve w1' corresponds to the samples thus replaced; it will be observed that it is phase-shifted by $\Delta t$ relative to the original curve w1. The sequence of digital values d0, d1, d2, d3, . . . generated by the two digitizers 6, 9 thus corresponds imperfectly to the analog signal w1. It is thus necessary to correct the phase shift between the sampled signals.

The invention is based on the observation that, in practice, the phase shift $\Delta t$ is approximately constant and that the variation of $\Delta t$ in time can generally be disregarded. Furthermore, the invention is based notably on the observation that the phase shift $\Delta t$ between the real sampling times t1, t3, t5, . . . and the ideal sampling times t1', t3', t5' is equal to the phase shift that must be applied to the wave shape w1' for it to superimpose in an optimal manner with the input signal w1.

Figure 4:
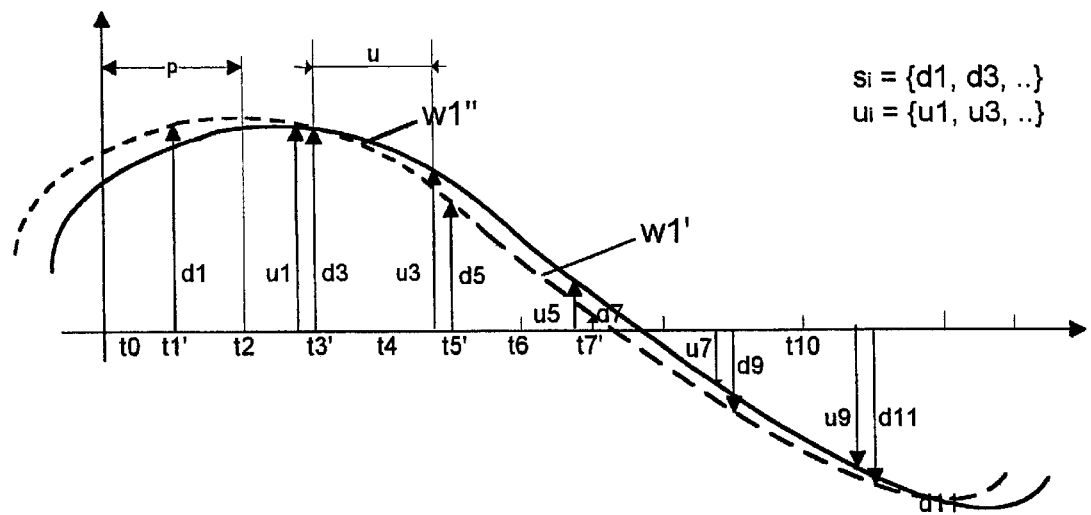

If $r_i$ designates the sequence of digital values {d0, d2, d4, . . . } produced by the reference digitizer 6 and $s_i$ the second sequence of values {d1, d3, d5, . . . } produced by the second digitizer 9, a phase-shifted digital sequence $u_i$ can be defined, as illustrated in FIG. 4, and obtained from the second sequence $s_i$ by simple linear interpolation:

$$u_i(x)=s_i+x \cdot (s_i-s_{i-1})$$

where x=x/p is a value between 0 and 1 that indicates the phase shift in relative terms between $u_i$ and $s_i$. The value u thus indicates a correction of the phase shift applied to the sequence $s_i$.

The phase shift between digitizers is minimal when the curves w1 and w1" superimpose in an optimal fashion, i.e. when the distance between $u_i$ and $r_i$ is minimal.

It is thus necessary to choose the relative phase shift x so that the sum L of the squares between the points $r_i$ of w1 and the points $u_i$ obtained by interpolation from are minimal:

$$L=\Sigma_i[r_i-u_i(x)]^2$$

The optimal phase shift value x to be applied to the second digitizer 9 is thus obtained by deriving L relative to x, which gives with the aid of simple operations, not detailed here, the following value of x:

$$x = \frac{\sum_i (r_i - s_i) \cdot (s_i - s_{i-1})}{\sum_i (s_i - s_{i-1}) \cdot (s_i - s_{i-1})}$$

and thus, in absolute terms, a phase shift correction u=px.

It will be observed that the calculation of u requires only simple arithmetic operations that can be carried out rapidly by a simple electronic calculator.

Figure 5:
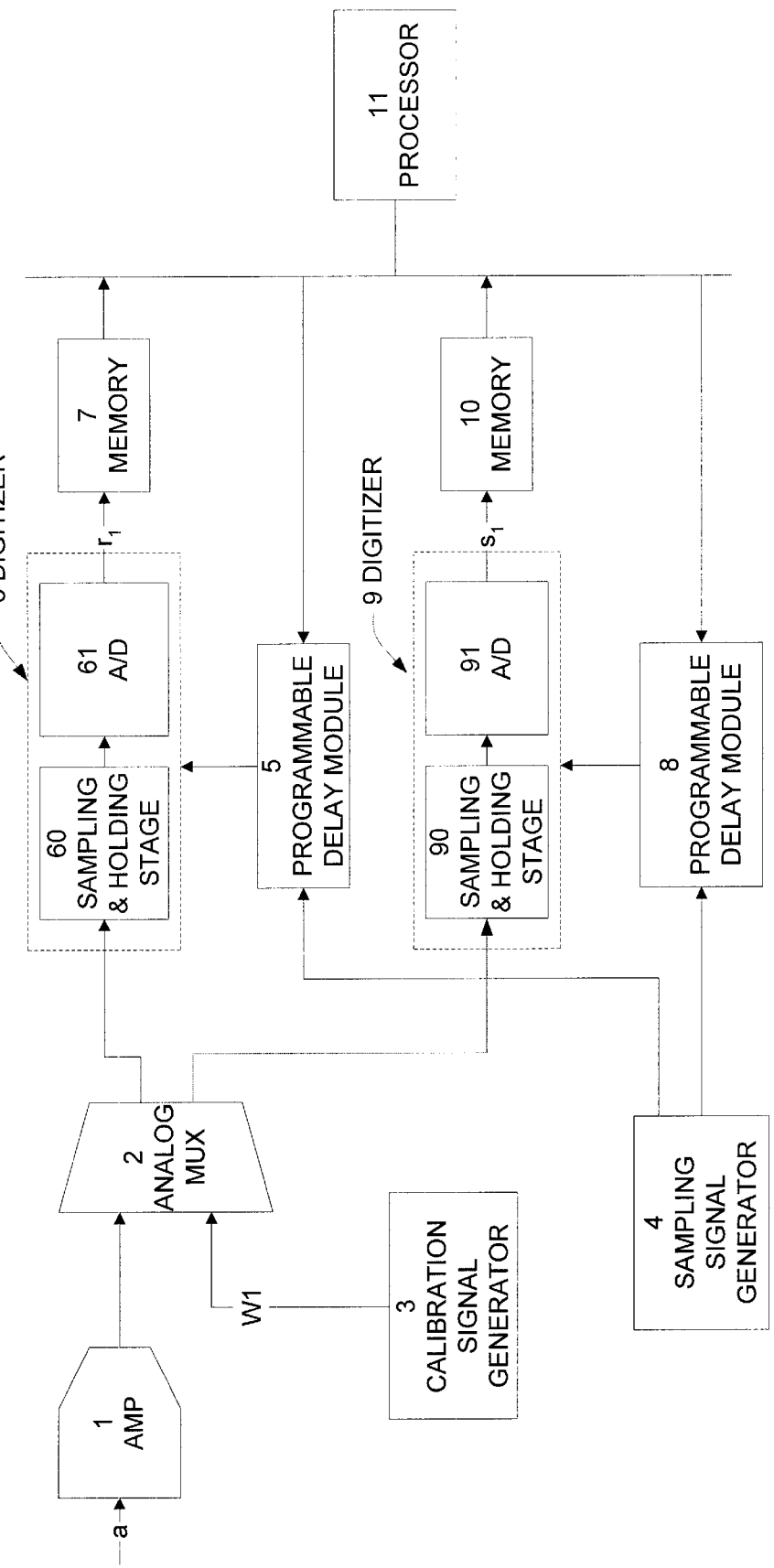
FIG. 5 a data acquisition system according to the invention.

FIG. 5 illustrates a data acquisition circuit according to the invention. The circuit comprises an input for an analog signal a to be acquired as well as an amplifier 1 for this signal (optional). An analog multiplexer 2 permits to choose between applying the amplified signal a or inserting a calibration signal w1 produced by the calibration signal generator 3.

The signal a or w1 selected by the multiplexer 2 is applied to a first digitizer 6 and to a second digitizer 9. The digitizers 6, respectively 9, comprise a sampling and a holding stage 60, respectively 90, and a high-frequency analog-to-digital converter 61, respectively 91.

A sampling signal generator 4, that can be implemented on another module or on another electronic card, supplies to a programmable delay module 5, respectively 8, a sample signal of frequency 1/p. The delay imposed by the delay modules 5, respectively 8, is determined by means of a digital value supplied by the digital processor 11. As mentioned above, different delays will be programmed so as to impose a phase shift of exactly p/2 between the signals at the output of the two delay modules. These signals are applied as sample signal to the digitizers 6, respectively 9.

The sequence of digital values $r_i$, respectively $s_i$, obtained by the digitizers 6, respectively 9, are stored in a digital memory 7, respectively 10, that can be read by the digital processor 11. The memories 7, 10 can be constituted by any type of dynamic or preferably static memory, comprising one or several discrete modules arranged according to any appropriate schema. In a preferred embodiment of the invention, the memories are double access memories enabling the digital processing system 11 to access the data stored while new data are being written.

The phase shift between the two digitizers 6, 9 in the acquisition system can be calibrated by the following method:

- during a calibrating operation, for example when the circuit is powered up, a calibration signal w1 is generated by the generator 3 and selected by the multiplexer 2,
- w1 is digitized by the two digitizers 6, 9 at the sampling times defined by the delay modules 5, 8 and a sequence $r_i$ of n digital values generated by the first digitizer 6 as well as another sequence $s_i$ generated by the second digitizer 9 are obtained,
- the sequences $r_i$, $s_i$ are memorized in the memories 6, 9,
- said memories are accessed by the processor 11 and the value of the phase shift correction u is calculated according to the aforementioned equation,
- the phase shift correction is applied by the delay module 8 by means of the phase shift correction value u thus calculated.

The method according to the invention can be applied with practically any type of signal w1, subject to some hardly constraining conditions:

- It must have reasonably symmetrical slopes,
- The number of digitized values (typically 1,000 to 10,000) should encompass at least a dozen of periods of the calibration signal, which constitutes a lower limit to the frequency of said signal,
- The frequency of the calibration signal w1 should not exceed 10% of the sampling frequency.

The one skilled in the art will understand that the invention can also be used for calibrating the phase shift in data acquisition systems comprising more than two digitizers, by a simple adaptation of the aforementioned equation for calculating u. The calibration process can for example be carried out by calibrating in turn each of the digitizers relative to a digitizer chosen as reference, or in a single operation by calculating the phase shift errors on all the digitizers.

The calculation of u can profitably be carried out by an appropriate program executed by the processor 11; this operation being effected only during the calibration process, the constraints of calculation speed are not critical. The program will profitably be stored on a computer data carrier capable of being read by the digital processor 11 in the data acquisition system so as to have it execute the method of the invention. It is however also possible to provide a specific circuit, for example an ASIC or FPGA, for carrying out this calculation without using the processor 11.

What is claimed is:

1. An analog-to-digital conversion circuit for a high-frequency data acquisition system, comprising:

a plurality of digitizers capable of sampling and digitizing a high-frequency analog input signal, the sampling times of the different digitizers being phase-shifted, a circuit for calibrating the phase shift between a first digitizer and a second digitizer, wherein said circuit for calibrating said phase shift calculates interpolated digital values determined by interpolating at the sampling times of the first digitizer from the digital values supplied by the second digitizer and determines a phase shift correction value chosen so that the distance between a sequence of digital values determined by the first digitizer and the sequence of said interpolated digital values is minimized.

2. The circuit according to claim 1, wherein said phase shift correction value is determined according to the following equation:

$$u = p \cdot \frac{\sum_i (r_i - s_i) \cdot (s_i - s_{i-1})}{\sum_i (s_i - s_{i-1}) \cdot (s_i - s_{i-1})}$$

and wherein u represents the phase shift correction value, p represents the sampling period, $r_i$ represents the value supplied by the first digitizer at the time i, and $s_i$ represents the value supplied by the second digitizer at the corresponding sampling time.

3. The circuit according to claim 1, further comprising a calibration signal generator capable of generating a calibration signal for said digitizers during said phase shift calibration process.

4. The circuit according to claim 1, further comprising a single sampling signal generator controlling said plurality of digitizers through programmable delays.

5. The circuit according to claim 4, further comprising a digital processor designed to process the digital values supplied by said plurality of digitizers during said calibration process to determine the phase shift correction value or values and to control said programmable delays.

6. The circuit according to claim 1, further comprising a storage memory for storing said digital values supplied by each digitizer.

7. A subsystem for calibrating a phase shift between a first digitizer and a second digitizer in a measurement acquisition system comprising a plurality of digitizers said subsystem comprising:

means for sampling and digitizing a high-frequency analog input signal, the sampling times of the different digitizers being phase-shifted, means for calibrating said phase shift including:

means for calculating interpolated digital values determined by interpolating at the sampling times of the first digitizer from the digital values supplied by the second digitizer;

means for determining a phase shift correction value chosen so that the distance between a sequence of digital values determined by the first digitizer and the sequence of said interpolated digital values is minimized; and means for utilizing the phase shift correction value or values to modify said phase shift between the first digitizer and the second digitizer, wherein said phase shift correction value is determined according to the following equation:

$$u = p \cdot \frac{\sum_i (r_i - s_i) \cdot (s_i - s_{i-1})}{\sum_i (s_i - s_{i-1}) \cdot (s_i - s_{i-1})}$$

and wherein u represents the phase shift correction value, p represents the sampling period, $r_i$ represents the value supplied by the first digitizer at the time i, and $s_i$ represents the value supplied by the second digitizer at the corresponding sampling time.

8. An analog-to-digital conversion circuit for a high-frequency data acquisition system, comprising:

a plurality of digitizers capable of sampling and digitizing a high-frequency analog input signal, the sampling times of the different digitizers being phase-shifted, a sampling signal generator controlling the sampling signals through programmable delays, said sampling signals defining the sampling times of said digitizers, a phase shift calibration circuit between a first digitizer and a second digitizer, wherein said phase shift calibration circuit calculates interpolated digital values determined by interpolating at the sampling times of the first digitizer from the digital values supplied by the second digitizer and determines a phase shift correction value chosen so that the distance between a sequence of digital values determined by the first digitizer and the sequence of said interpolated digital values is minimized; and wherein said phase shift correction value is applied to said programmable delay or delays.

9. The conversion circuit according to claim 8, further comprising a digital processor designed to process the digital values supplied, by said plurality of digitizers during said calibration process to determine the phase shift correction value or values and to control said programmable delays.

10. The circuit according to claim 9, wherein said phase shift correction value is determined according to the following equation:

$$u = p \cdot \frac{\sum_i (r_i - s_i) \cdot (s_i - s_{i-1})}{\sum_i (s_i - s_{i-1}) \cdot (s_i - s_{i-1})}$$

and wherein u represents the phase shift correction value, p represents the sampling period, $r_i$ represents the value supplied by the first digitizer at the time i, and $s_i$ represents the value supplied by the second digitizer at the corresponding sampling time.

11. A method for calibrating a phase shift between a first digitizer and a second digitizer in a measurement acquisition system comprising a plurality of digitizers said method comprising the steps of: sampling and digitizing a high-frequency analog input signal, the sampling times of the different digitizers being phase-shifted, calibrating said phase shift by performing the steps of:
  calculating interpolated digital values determined by interpolating at the sampling times of the first digitizer from the digital values supplied by the second digitizer;
  determining a phase shift correction value chosen so that the distance between a sequence of digital values determined by the first digitizer and the sequence of said interpolated digital values is minimized; and
  utilizing the phase shift correction value or values to modify said phase shift between the first digitizer and the second digitizer.

12. A method according to claim 11, wherein said phase shift correction value is determined according to the following equation:

$$u = p \cdot \frac{\sum_i (r_i - s_i) \cdot (s_i - s_{i-1})}{\sum_i (s_i - s_{i-1}) \cdot (s_i - s_{i-1})}$$

and wherein u represents the phase shift correction value, p represents the sampling period, $r_i$ represents the value supplied by the first digitizer at the time i, and $s_i$ represents the value supplied by the second digitizer at the corresponding sampling time.

13. The method according to claim 11, further comprising the step of generating a calibration signal by using a calibration signal generator during said phase shift calibration process.

14. The method according to claim 11, wherein said phase shift correction value or values are determined by a digital processor designed to process the digital values supplied by said plurality of digitizers.

15. The method according to claim 11, comprising the step of: storing the values supplied by each digitizer in a storage memory.

16. A data carrier capable of being read by a digital processor in a data acquisition system for executing the method of one of the claims 11 to 15.

17. An analog-to-digital conversion circuit for a high-frequency data acquisition system, comprising:

a plurality of digitizers capable of sampling and digitizing a high-frequency analog input signal, the sampling times of the different digitizers being phase-shifted, a circuit for calibrating the phase shift between a first digitizer and a second digitizer, said circuit for calibrating said phase shift determining a phase shift correction value chosen so that the distance between a sequence of digital values determined by the first digitizer, and a sequence of corresponding digital values determined by interpolating at the sampling times of the first digitizer from the digital values supplied by the second digitizer, is minimized, wherein said phase shift correction value is determined according to the following equation:

$$u = p \cdot \frac{\sum_i (r_i - s_i) \cdot (s_i - s_{i-1})}{\sum_i (s_i - s_{i-1}) \cdot (s_i - s_{i-1})}$$

wherein u represents the phase shift correction value, p represents the sampling period, $r_i$ represents the value supplied by the first digitizer at the time i and $s_i$ the value supplied by the second digitizer at the corresponding sampling time.

18. An analog-to-digital conversion circuit for a high frequency data acquisition system, comprising:

a plurality of digitizers capable of sampling and digitizing a high-frequency analog input signal, the sampling times of the different digitizers being phase-shifted;

a sampling signal generator controlling the sampling signals through programmable delays, said sampling signals defining the sampling times of said digitizers;

a phase shift calibration circuit between a first digitizer and a second digitizer, said circuit for calibrating said phase shift determining a phase shift correction value chosen so that the distance between a sequence of digital values determined by the first digitizer, and a sequence of corresponding digital values determined by interpolating at the sampling times of the first digitizer from the digital values supplied by the second digitizer, is minimized, said correction value being applied to said programmable delay or delays; and a digital processor designed to process the digital values supplied, by said plurality of digitizers during said calibration process to determine the phase shift correction value or values and to control said programmable delays, wherein said phase shift correction value is determined according to the following equation:

$$u = p \cdot \frac{\sum_i (r_i - s_i) \cdot (s_i - s_{i-1})}{\sum_i (s_i - s_{i-1}) \cdot (s_i - s_{i-1})}$$

and wherein u represents the phase shift correction value, p represents the sampling period, $r_i$ represents the value supplied by the first digitizer at the time i, and $s_i$ represents the value supplied by the second digitizer at the corresponding sampling time.

19. A method for calibrating a phase shift between a first digitizer and a second digitizer in a measurement acquisition system comprising a plurality of digitizers, said method comprising the steps of:

sampling and digitizing a high-frequency analog input signal, the sampling times of the different digitizers being phase-shifted; and determining the phase shift so that the distance between a sequence of digital values determined by the first digitizer, and a sequence of corresponding digital values determined by interpolating at the sampling times of the first digitizer from the digital values supplied by the second digitizer, is minimized, wherein said phase shift is determined using a phase shift correction value calculated according to the following equation:

$$u = p \cdot \frac{\sum_i (r_i - s_i) \cdot (s_i - s_{i-1})}{\sum_i (s_i - s_{i-1}) \cdot (s_i - s_{i-1})}$$

and wherein u represents the phase shift correction value, p represents the sampling period, $r_i$ represents the value supplied by the first digitizer at the time i, and $s_i$ represents the value supplied by the second digitizer at the corresponding sampling time.

* * * * *